Patented Oct. 9, 1945

2,386,507

UNITED STATES PATENT OFFICE 2,386,507

MANUFACTURE AND USE OF HYDROCARBONS DERIVED FROM STYRENE AND ITS HOMOLOGUES

Denis Cheselden Quin, London, England

No Drawing. Application January 21, 1942, Serial No. 427,658. In Great Britain June 9, 1941

12 Claims. (Cl. 260—668)

This invention relates to the manufacture of mixtures of hydrocarbons miscible and compatible with and possessing properties which render them suitable for use, inter alia, as plasticisers for polystyrene resins and resinous compositions composed thereof, more especially such resins and resinous compositions intended for use in the electrical arts, it being understood that the term "polystyrene resin" as used herein includes both a resin consisting of a polymer or polymers of monostyrene and also a resin consisting of a polymer or polymers of a homologue of monostyrene.

It is known that when a monocyclic hydrocarbon containing the styryl radical, such as monomeric styrene, which is the form of styrene herein referred to by the term "styrene," is submitted to mild and limited polymerisation under suitable conditions, there is obtained a mixture of saturated and unsaturated hydrocarbons of relatively low molecular weight which can be distilled under conditions of diminished pressure with little or no decomposition. This mixture of saturated and unsaturated hydrocarbons comprises an olefinically unsaturated dimer of said styryl compound and a condensation product of the said aromatic hydrocarbon free from unsaturation other than aromatic unsaturation. Such a mixture of hydrocarbons is generally known as "liquid distyrene" and it is considered that the relatively low molecular weight saturated and unsaturated hydrocarbons in the mixture are compounds of two or more molecules of the parent styrene. Similar mixtures of hydrocarbons are obtained by a limited polymerisation of the homologue of styrene.

It is also known that a monocyclic hydrocarbon containing the styryl radical, such as styrene or a homologue thereof will condense in the presence of a suitable condensing agent with an aromatic hydrocarbon free from unsaturation other than aromatic unsaturation, such as benzene, ethyl benzene, toluene, xylene, pseudocumene, naphthalene, hydrindene and tetrahydronaphthalene to form mixtures of unsaturated (for example the hydrocarbon distyrene) and saturated liquid hydrocarbons of relatively low molecular weight. Thus the condensation product comprises a mixture containing saturated hydrocarbons formed, for example, by the combination of one molecule of the styryl compound, such as styrene, with one molecule of the aromatic compound free from unsaturation other than aromatic unsaturation, the mixture also containing an olefinically unsaturated dimer of the styryl compound. The ratio of the unsaturated hydrocarbons to saturated hydrocarbons present in such mixtures as the result of the condensation largely depends on the relative molecular proportions used of styrene or homologue thereof to aromatic hydrocarbon.

For convenience, therefore, the mixtures will be referred to herein and in the appended claims simply as "hydrocarbon mixtures of the liquid distyrene type," it being understood that this term includes the specific mixture hereinbefore referred to as "liquid distyrene."

Hydrocarbon mixtures of the liquid distyrene type as referred to above are both miscible and also compatible with polystyrene resins. They are usually defective, however, as plasticisers for such resins on account of their relatively high electrical power factor and also their tendency, as regards the unsaturated constituents, to oxidise and to polymerise in situ upon incorporation in a polystyrene resin, ultimately losing much of their initial plasticising value and causing difficulty in use.

Investigation has revealed that these defects are due to the presence of unsaturated olefinic linkages in the unsaturated constituent or constituents of the hydrocarbon mixture and that by submitting the mixture to treatment resulting in the addition of hydrogen to olefinic linkages, preferably to the extent of substantially complete saturation of the unsaturated constituent or constituents of the mixture, it is possible very substantially to lower the power factor of the material and/or to reduce its tendency to oxidation or polymerisation upon incorporation with a polystyrene resin and in this way to impart improved properties to the treated material, thus rendering it in conjunction with its properties of miscibility and compatibility with polystyrene resins and other properties as hereinafter indicated, eminently and more advantageously suitable for use as a plasticiser for such resins.

According to the invention, therefore, a process for the manufacture of a material suitable for use as a plasticiser for polystyrene resins and resinous compositions composed thereof, consists in submitting a hydrocarbon mixture of the liquid distyrene type to treatment with hydrogen so as at least to reduce the degree of unsaturation of the mixture as regards unsaturated olefinic constituents thereof, by the addition of hydrogen thereto, molecular hydrogen providing optimum results.

It is usually necessary or at any rate preferable to carry the treatment with hydrogen to the extent of substantially complete saturation of the said olefinic constituents.

It is also usually necessary or preferable to avoid appreciable hydrogenation of the aromatic rings of the nuclei.

The treatment with hydrogen may take any convenient form. It may consist, for example and in accordance with a preferred form of the invention, in hydrogenating the mixture in the presence of a hydrogenation catalyst and with the use as the hydrogenating medium of either gaseous hydrogen or a mixture of gaseous hydrogen and an inert gas. Or it may consist in treating the mixture with hydrochloric acid in the presence of zinc. The former method is, however, preferable, as it avoids the risk of contamination of the product with extraneous matter which is usually present in the case of the second-mentioned method.

The catalyst employed in the hydrogenation may be any known hydrogenation catalyst. It is generally preferred, however, to use nickel powder, or Raney metal, or nickel supported on kieselguhr, or nickel promoted with copper, aluminium, magnesium or chromium, or a platinum or palladium catalyst, it having been found that theses particular catalysts are specially effective in securing the desired results in the process.

Practically speaking, any of the usual conditions may be employed in the hydrogenation. For example, the pressure used may vary from atmospheric pressure up to a reasonably high elevated pressure insufficient, however, to cause hydrogenation of the aromatic rings of the hydrocarbons, although a particular order of pressure as hereinafter indicated has been found to give eminently satisfactory results. Similarly, in the case of use of a mixture of hydrogen with an inert gas as the hydrogenating medium, any usual proportions of hydrogen and inert gas in the mixture may be employed, although here again it is preferred to employ a mixture containing a large proportion of hydrogen.

According to one form of the process, the hydrocarbon mixture to be treated therein is mixed with a hydrogenation catalyst, for example one of the specific catalysts mentioned above, and in the presence of the catalyst is heated (for example at a temperature between 80 and 90° C.) under superatmospheric pressure (for example a pressure between 100 and 250 pounds per square inch) in gaseous hydrogen or a mixture of gaseous hydrogen and an inert gas so as partially or completely to saturate the unsaturated olefinic constituent or constituents of the mixture, after which the catalyst is removed from the hydrocarbon material and the latter is distilled under conditions of reduced pressure. This procedure is employed in the specific example of the invention hereinbefore mentioned.

According to another form of the process, which has been found to give very good results, the catalyst that is used in the process may be formed or activated in situ in the mixture of hydrocarbons to be treated during the course of the hydrogenation thereof, the process in this event consisting in mixing the said mixture of hydrocarbons with a reducible oxygen compound, for example the carbonate, formate, oxide or hydroxide, of a metal, for example nickel or copper, operative as a catalyst in the hydrogenation reaction, and passing a stream of gaseous hydrogen or gaseous hydrogen admixed with an inert gas through the resulting mixture at an elevated temperature, for example a temperature up to 300° C., sufficient to result in activation of the catalyst and at the same time in partial or complete saturation of the unsaturated olefinic constituent or constituents of the mixture of hydrocarbons.

Example

The following is an example of how in one preferred way the process of the invention may be carried into effect, as applied to the case where the mixture of hydrocarbons that is submitted to the saturation treatment is a mixture which has been produced by the condensation process referred to:—

One part of styrene is slowly run into one part of ethyl benzene (the proportions being reckoned by weight) while stirring vigorously with 80% sulphuric acid. The amount of 80% sulphuric acid can vary widely, but a convenient proportion is 25% reckoned on the total weight of the mixture which is formed. The mixture is stirred at a temperature of 90° C. and reaction ensues.

On completion of the reaction, the oily product is separated from the acid used in the process and washed thoroughly with water, after which it is dried and distilled.

The distillation of the product in this example may be effected at a temperature of 160–200° C. and under a pressure of 10 mm. of mercury, at which temperature and pressure no substantial decomposition takes place. The mixture of hydrocarbons so obtained from styrene and ethyl benzene usually possesses a bromine absorption of 0.14–0.27 gm. bromine per gramme. This value is greatly in excess of that of resinous higher polymers of styrene, and is indicative of the considerable loss of electrical power that would obtain if such material were used as a plasticiser for a resin required for electrical purposes.

In accordance with the present invention, the mixture of hydrocarbons is then admixed with a hydrogenation catalyst, for example 2% of nickel powder, and hydrogenated in an autoclave at a temperature of 80–90° C. and under a pressure of 100–250 pounds per square inch, using as the hydrogenating medium substantially pure gaseous hydrogen.

On cessation of hydrogen absorption, the catalyst is removed, for example by filtration or decantation of the liquid, after which the liquid is submitted to distillation under conditions of diminished pressure. Under a distillation pressure of 3 mm. of mercury and at a temperature of about 141° C., the distillate obtained is a water-white liquid having the following properties in respect of electrical power factor, bromine absorption, and viscosity, namely:—an electrical power factor of less than 0.0002 at frequencies up to about one megacycle and temperatures up to 80° C., a bromine absorption of less than 0.008 gm. bromine per gramme and a low viscosity of about nine times that of water at 25° C., which properties, as will be appreciated, render the material so produced highly suitable for use as a plasticiser for polystyrene resins, more especially those for use in the electrical arts.

As already indicated, the aromatic hydrocarbon used in the condensation process with styrene or a homologue thereof may be a hydrocarbon other than ethyl benzene, for example one or other of the specific instances of such other hydrocarbons mentioned above, or, if desired, a mixture of ethyl benzene and styrene obtained by the pyrolysis of ethyl benzene may be used as the starting material in the process, or a mixture of styrene and industrial xylene free from sulphur.

Similarly, condensing agents other than sulphuric acid may be employed in the condensation or polymerisation step of the process, for example sulphonic acids or phosphoric acid, although generally speaking, sulphuric acid has been found to give best results.

The invention includes within its scope not only the process hereinbefore described for the production of a material suitable for use as a plasticiser for polystyrene resins and resinous compositions composed of the same, but also the said material itself when produced by the process of the invention and polystyrene resins and resinous compositions composed of the same when plasticised with said material.

As will be appreciated, the process according to the present invention may be regarded as a process for improving hydrocarbon mixtures of the liquid distyrene type for use as plasticisers for polystyrene resins and resinous compositions composed thereof, it being understood that the term "improving" means enhancing qualities of such mixtures which are of special value from the point of view of plasticising polystyrene resins and resinous compositions composed of the same. In this connection it is to be remarked that hydrocarbon mixtures of the liquid distyrene type are largely if not entirely stabilised against polymerisation and oxidation by the treatment according to this invention. In addition, when the treatment is carried to a full olefinic linkage hydrogen saturation, it results in the mixture being possessed of an electrical power factor which is near to or comparable with that of high polymer styrene resins themselves, which is very important from the point of view of a plasticiser for a resin or resinous composition for electrical insulation and the like.

What I claim as my invention and desire to secure by Letters Patent of the United States is:

1. A process for the manufacture of a material suitable for use as a plasticiser for polystyrene resins, which comprises submitting a liquid reaction product, prepared by condensing a monocyclic hydrocarbon containing the styryl radical to produce a mixture comprising a condensation product of said aromatic hydrocarbon free from unsaturation other than aromatic unsaturation in admixture with an olefinically unsaturated dimer of said styryl compound, the resulting liquid reaction product being susceptible to distillation under reduced pressure conditions without substantial decomposition, to hydrogenation in the presence of a reducible oxygen compound of a metal hydrogenation catalyst, so as to substantially saturate the unsaturated olefinic linkages in the mixture, without appreciably hydrogenating the aromatic rings of the nuclei, the hydrogenation temperature being sufficient to activate the catalyst.

2. A process for the manufacture of a material suitable for use as a plasticiser for polystyrene resins, which comprises submitting a liquid reaction product, prepared by condensing a mixture of a monocyclic hydrocarbon containing the styryl radical and an aromatic compound of relatively low molecular weight free from unsaturation other than aromatic unsaturation to produce a mixture comprising a condensation product of one molecule of said styryl compound with one molecule of said second aromatic compound, in admixture with an olefinically unsaturated dimer of said styryl compound, the resulting liquid reaction produce being susceptible to distillation under reduced pressure conditions without substantial decomposition, to hydrogenation so as to substantially saturate the unsaturated olefinic linkages in the mixture without appreciably hydrogenating the aromatic rings of the nuclei.

3. A process for the manufacture of a material suitable for use as a plasticiser for polystyrene resins, which comprises submitting a liquid reaction product, prepared by condensing a mixture of a monocyclic hydrocarbon containing the styryl radical and an aromatic compound of relatively low molecular weight free from unsaturation other than aromatic unsaturation to produce a mixture comprising a condensation product of one molecule of said styryl compound with one molecule of said second aromatic compound, in admixture with an olefinically unsaturated dimer of said styryl compound, the resulting liquid reaction product being susceptible to distillation under reduced pressure conditions without substantial decomposition, to hydrogenation in the presence of a hydrogenation catalyst so as to substantially saturate the unsaturated olefinic linkages in the mixture, without appreciably hydrogenating the aromatic rings of the nuclei.

4. A complete process for the manufacture of a material suitable for use as a plasticiser for polystryrene resins, which comprises first producing a liquid condensation reaction product by heating a mixture of styrene and an aromatic hydrocarbon free from unsaturation other than aromatic unsaturation in the presence of an acid condensing agent to produce a mixture comprising a condensation product of one molecule of said styrene with one molecule of said second aromatic compound in admixture with an olefinically unsaturated dimer of said styrene, the resulting liquid reaction product being susceptible to distillation under reduced pressure conditions without substantial decomposition, separating the resulting reaction product from the condensing agent used, washing and drying the separated product and finally distilling it under conditions of reduced pressure; then submitting the distillate to hydrogenation in the presence of a hydrogenation catalyst so as substantially completely to saturate the unsaturated olefinic linkages in the mixture without appreciably hydrogenating the aromatic rings of the nuclei; then separating the catalyst from the hydrogenated material and then distilling the latter under conditions of reduced pressure.

5. A process as specified in claim 4, wherein the aromatic hydrocarbon employed is ethyl benzene.

6. A process as specified in claim 4, wherein the hydrogenation is effected at a temperature of 80–90° C. and under a pressure of 100–250 pounds per square inch.

7. A process as specified in claim 4, wherein the condensing agent used is sulphuric acid.

8. A process as specified in claim 3, wherein the hydrogenation is combined with a process for activating the catalyst, by mixing the hydrocarbon mixture with a reducible oxygen compound operative as a catalyst in the hydrogenation reaction and passing hydrogen gas through the resulting mixture at a sufficiently elevated temperature to result in activation of the catalyst and at the same time in reduction of the degree of unsaturation of the mixture as regards unsaturated olefinic linkages therein, by the addition of hydrogen thereto.

9. As a new article of manufacture, a material suitable for use as a plasticiser for polystyrene resins, the said material being a mixture of relatively low molecular weight hydrocarbons and having miscibility and compatibility with polystyrene resins, the said material being produced by submitting to hydrogenation, so as to substantially saturate the unsaturated olefinic linkages without appreciably hydrogenating the aromatic rings of the nuclei, a liquid reaction product prepared by condensing a mixture of a monocyclic hydrocarbon containing a styrene radical and an aromatic compound of relatively low molecular weight free from unsaturation other than aromatic unsaturation to produce a mixture comprising a condensation product of one molecule of said styryl compound with one molecule of said second aromatic compound, in admixture with an olefinically unsaturated dimer of said styryl compound, the resulting liquid reaction product being susceptible to distillation under reduced pressure conditions without substantial decomposition.

10. As a new article of manufacture, a material suitable for use as a plasticiser for polystyrene resins, the said material being a mixture of low molecular weight aromatic hydrocarbons and having miscibility and compatibility with polystyrene resins and an electrical power factor of less than 0.0002 at frequencies up to about 1 megacycle and temperatures up to 80° C., the said material being produced by submitting to hydrogenation, so as to substantially saturate the unsaturated olefinic linkages without appreciably hydrogenating the aromatic rings of the nuclei, the distillate of a liquid reaction product prepared by condensing a mixture of a monocyclic hydrocarbon containing a styryl radical and an aromatic compound of relatively low molecular weight free from unsaturation other than aromatic unsaturation to produce a mixture comprising a condensation product of one molecule of said styryl compound with one molecule of said second aromatic compound in admixture with an olefinically unsaturated dimer of said styryl compound, the resulting liquid reaction product being susceptible to distillation under reduced pressure conditions without substantial decomposition.

11. The composition as in claim 10 wherein the monocyclic hydrocarbon containing the styryl radical is styrene, and the second aromatic compound is ethyl benzene.

12. The composition as in claim 10, wherein the aromatic hydrocarbon containing a styryl radical is styrene, and the other aromatic hydrocarbon is naphthalene.

DENIS CHESELDEN QUIN.